(12) United States Patent
Chimonides

(10) Patent No.: US 6,237,548 B1
(45) Date of Patent: May 29, 2001

(54) FLOW CONTROL FOR AN OIL NOZZLE

(75) Inventor: Nikos Chimonides, Northants (GB)

(73) Assignees: Cummins Engine Company Ltd., Darlington; Iveco Ltd., Watford; New Holland U.K. Ltd., Basildon, all of (GB)

( * ) Notice: Subject to any disclaimer, the term of this patent is extended or adjusted under 35 U.S.C. 154(b) by 0 days.

(21) Appl. No.: 09/378,605

(22) Filed: Aug. 20, 1999

(30)    Foreign Application Priority Data

Aug. 22, 1998   (GB) .................................................... 9818275

(51) Int. Cl.$^7$ ........................................................ F01P 1/04
(52) U.S. Cl. ............................................................ 123/41.35
(58) Field of Search .......................................... 123/41.35

(56)         References Cited

U.S. PATENT DOCUMENTS

| | | |
|---|---|---|
| 2,455,625 | 12/1948 | Trantin, Jr. . |
| 2,788,773 | 4/1957 | Meurer . |
| 3,332,436 | 7/1967 | Welty . |
| 4,098,294 | 7/1978 | Woods . |
| 4,742,803 | 5/1988 | Chiles et al. . |
| 5,533,472 | 7/1996 | Sands et al. . |
| 5,860,395 | * 1/1999 | Klotz et al. ........................ 123/41.35 |

FOREIGN PATENT DOCUMENTS

| | | |
|---|---|---|
| 0 056 423 | 7/1982 | (EP) . |
| 1055556 | 1/1967 | (GB) . |
| 1259805 | 1/1972 | (GB) . |
| 2 016 168 | 9/1979 | (GB) . |
| 164 032 | 7/1958 | (SE) . |
| 1430575 A1 | 10/1988 | (SU) . |

* cited by examiner

Primary Examiner—Willis R. Wolfe
Assistant Examiner—Katrina B. Harris
(74) Attorney, Agent, or Firm—Gary M. Gron

(57)            ABSTRACT

An oil passage for supplying oil to a nozzle 10 is formed of two communicating bores which are misaligned with one another. The area of overlap between the bores at their intersection is smaller than the cross-section of each of the bores and serves as a flow regulating throttle along the oil passage.

4 Claims, 1 Drawing Sheet

FLOW CONTROL FOR AN OIL NOZZLE

FIELD OF THE INVENTION

The present invention relates to controlling the oil flow to an oil nozzle and is particularly applicable to a nozzle for directing a cooling stream of oil onto the underside of a reciprocating piston of an engine.

BACKGROUND OF THE INVENTION

It is known to cool the reciprocating piston of an engine by directing a stream of oil onto its underside. The nozzle used to direct the oil stream may be a so-called dowel nozzle, which is a carefully shaped and positioned tube fed from a dedicated oil gallery and aiming a jet of oil onto a target point on the piston. Alternatively, the nozzle may be in the form of a plastic nozzle inserted into a bore in the saddle of a main bearing and fed from an annular oil groove in the upper main bearing shell. These two types of nozzle are designed to operate with different oil flow rates and the nozzle fed from a dedicated oil gallery requires an oil pump of higher output.

If different variants of the same engine produced by a manufacturer are designed to operate with different types of oil nozzle, the spray pattern achieved by supplying oil to a plastic nozzle using a higher output pump intended for a dowel nozzle results in an oil plume angle that is so large that the oil achieves a negligible cooling effect.

Simply reducing the bore of the nozzle itself does not correct this problem but will probably increase the plume angle still further due to the higher dynamic pressure across the plastic nozzle.

Object of the Invention

The present invention therefore seeks to provide a simplified means of regulating the oil flow to a nozzle that will allow a nozzle designed for use with a low output oil pump to operate efficiently with a higher output oil pump.

SUMMARY OF THE INVENTION

In accordance with a first aspect of the present invention, there is provided an oil passage for supplying oil to a nozzle, comprising two communicating bores which are misaligned with one another such that the area of overlap between the bores at their intersection is smaller than the cross-section of each of the bores and serves as a flow regulating throttle along the oil passage.

In accordance with a second aspect of the present invention, there is provided an internal combustion engine having an oil nozzle for cooling a reciprocating piston of the engine by directing a stream of oil onto the underside of the piston and a passage for supplying oil to the nozzle, wherein the oil passage comprises two communicating bores which are misaligned with one another such that the area of overlap between the bores at their intersection is smaller than the cross-section of each of the bores and serves as a flow regulating throttle along the oil passage.

BRIEF DESCRIPTION OF THE DRAWINGS

The invention will now be described further, by way of example, with reference to the accompanying drawing, which is a schematic perspective from beneath an engine block embodying the invention.

DETAILED DESCRIPTION OF THE PREFERRED EMBODIMENTS

Figure 1:
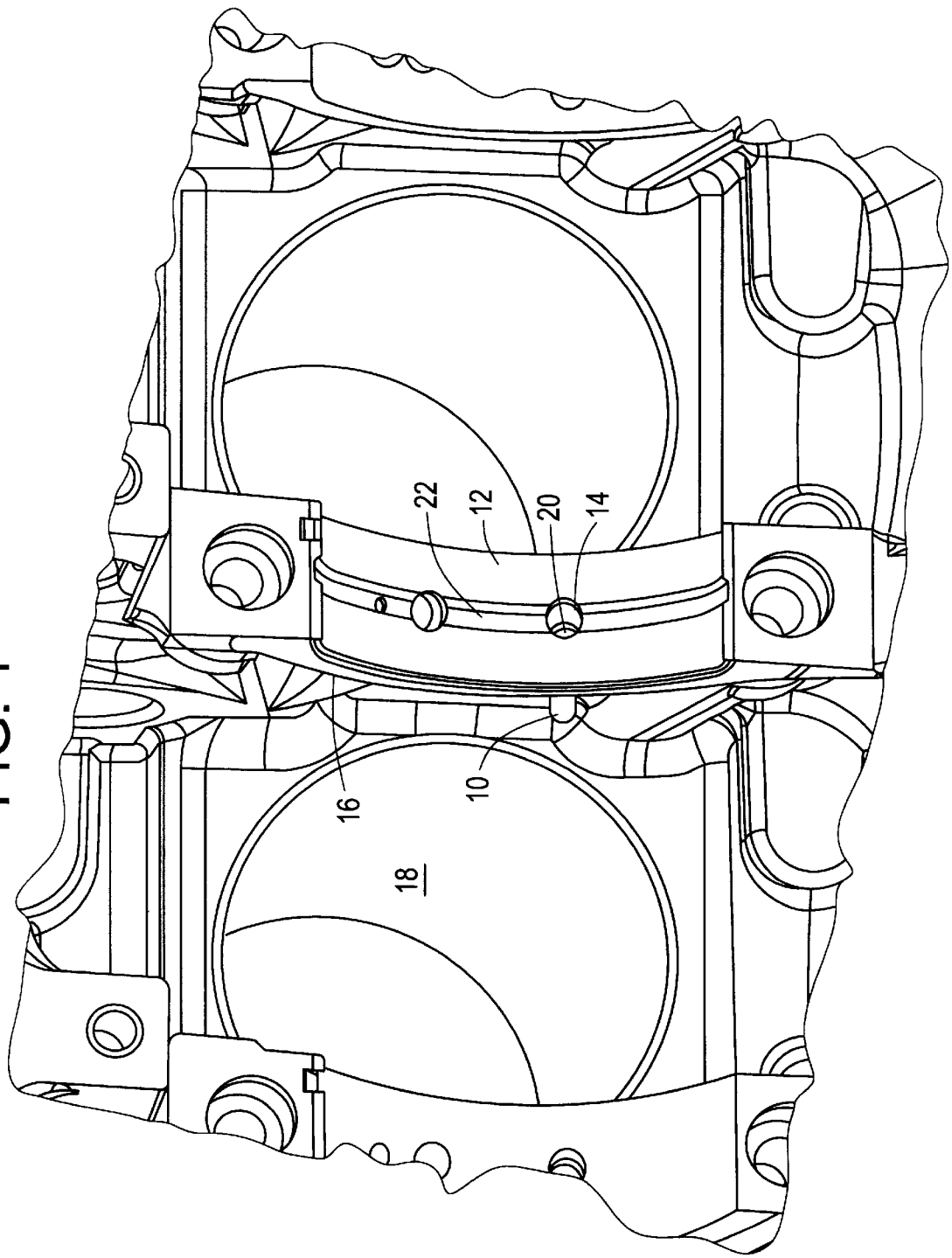

The single figure shows an engine block as viewed from beneath before assembly. The crankshaft, pistons and main bearing pillar blocks are omitted from the drawing to simplify an understanding of the present invention. The figure shows two cylinder bores 18 and a main bearing saddle 16 positioned between them. The upper shell 12 of a main bearing is also shown positioned within the saddle 16. The main bearing shell 12 has a central annular oil grove 22 supplied with oil from the engine oil pump (not shown) in order to lubricate the main bearing.

To cool the piston reciprocating within the cylinder bore 18, a plastic nozzle 10 is inserted into a bore drilled at an angle into the main bearing saddle 16. A bore 14 is formed through the main bearing shell 12 to establish communication between the annular oil groove 22 and a bore 13 into which the nozzle 10 is inserted. The axes of the bore 14 and the bore 13 receiving the nozzle 10 are misaligned with one another so that the area of overlap 20 between them is smaller than each of the bores and acts as a throttle. As a result, oil is supplied through the annular groove 22 to the nozzle 10 through a throttling aperture 20 that regulates the oil flow so that the oil plume from the nozzle 10 is shaped to achieve efficient cooling.

The misalignment of the bores to produce a throttling aperture allows the same high output oil pump to be used for this type of piston cooling as used in a variant of the engine in which the piston is cooled by a doweled nozzle fed from a dedicated oil gallery.

While the invention has been described with reference to the particular use of an oil passage intended for supplying oil to an oil nozzle fitted in a bore in a main bearing saddle, it will be appreciated that, in principle, an oil passage formed of misaligned bores can be used in other applications to regulate the oil supply to a nozzle to limit the rate of oil flow for any given supply pressure.

In the embodiment of the invention described, the two misaligned bores constituting the oil flow passage are formed in two separate elements but it will be appreciated that one can drill from opposite sides into the same element to achieve the same objective. Such a constricted wide passage is to be preferred to a passage that has a uniformly narrow cross-section, as small diameter drill bits are more prone to wear and breakage.

Have thus described the invention, what is desired to be secured by Letters Patent of the United States is:

What is claimed is:

1. An internal combustion engine having an oil nozzle for cooling a reciprocating piston of the engine by directing a stream of oil onto the underside of the piston and a passage for supplying oil to the nozzle, wherein the oil passage comprises two communicating bores having central axes misaligned with one another such that the area of overlap between the bores at their intersection is smaller than the cross-section of each of the bores and serves as a flow regulating throttle along the oil passage.

2. An internal combustion engine having an oil nozzle for cooling a reciprocating piston of the engine by directing a stream of oil onto the underside of the piston and a passage for supplying oil to the nozzle, wherein the oil passage comprises two communicating bores which are misaligned with one another such that the area of overlap between the bores at their intersection is smaller than the cross-section of each of the bores and serves as a flow regulating throttle along the oil passage, wherein one of the bores is drilled into a saddle of a crankshaft main bearing and the second bore is formed in a main bearing shell received within the saddle, the oil nozzle being arranged at the end of the first bore and the second bore communicating with an annular oil supply groove on the radially inner surface of the main bearing shell.

3. An internal combustion engine as claimed in claim 2, wherein the oil nozzle is formed as a plastic insert fitted into the end of the first bore.

4. An internal combustion engine as claimed in claim 1, wherein two communicating bores are formed in separate elements of said engine abutting one another to form said oil passage.

* * * * *